United States Patent
Bae

(10) Patent No.: US 8,948,384 B2
(45) Date of Patent: Feb. 3, 2015

(54) IMAGE ENCRYPTING/DECRYPTING SYSTEM AND METHOD

(75) Inventor: Tae Meon Bae, Daegu (KR)

(73) Assignee: SK Planet Co., Ltd. (KR)

( * ) Notice: Subject to any disclaimer, the term of this patent is extended or adjusted under 35 U.S.C. 154(b) by 178 days.

(21) Appl. No.: 12/737,765

(22) PCT Filed: May 11, 2009

(86) PCT No.: PCT/KR2009/002464
§ 371 (c)(1),
(2), (4) Date: Feb. 10, 2011

(87) PCT Pub. No.: WO2010/018917
PCT Pub. Date: Feb. 18, 2010

(65) Prior Publication Data
US 2011/0135089 A1   Jun. 9, 2011

(30) Foreign Application Priority Data
Aug. 12, 2008 (KR) .................. 10-2008-0078743

(51) Int. Cl.
*H04L 29/06* (2006.01)
*H04N 7/167* (2011.01)
(Continued)

(52) U.S. Cl.
CPC ...... *H04N 7/1675* (2013.01); *H04N 21/234309* (2013.01); *H04N 21/2347* (2013.01); *H04N 21/4405* (2013.01)
USPC ............. 380/200; 380/210; 380/217; 726/26; 725/31

(58) Field of Classification Search
CPC ........ H04N 7/167; H04N 7/1675; H04K 1/06
USPC .......................................... 380/200, 210, 217
See application file for complete search history.

(56) References Cited

U.S. PATENT DOCUMENTS 4,575,754 A    3/1986  Bar-Zohar
4,905,278 A *  2/1990  Parker ........................ 380/236
(Continued)

FOREIGN PATENT DOCUMENTS

CN    101146225    3/2008
EP    0300678      1/1989
(Continued)

OTHER PUBLICATIONS

Qiao et al., "Comparison of MPEG Encryption Algorithms", 1998, pp. 437-448.*

*Primary Examiner* — David Pearson
*Assistant Examiner* — Thaddeus Plecha
(74) *Attorney, Agent, or Firm* — Baker Hostetler LLP

(57) ABSTRACT

The present invention relates to an image encrypting/decrypting system and method devised in such a way that: a transmitter and a receiver for transmitting and receiving moving images share a seed for encrypting and decrypting the moving images; the transmitter transmits moving images after encrypting the moving images by dividing them into segment units and mixing the time sequencing of the images in each of the segments in accordance with a random number generated by means of the seed; and the receiver decrypts the moving images which it receives, by sorting them in segment units and then restoring the time sequencing of the images in each of the segments in accordance with the random number generated by means of the seed. The present invention makes it possible to effectively implement the function of encrypting after having carried out transcoding even in cases involving an alteration to the frame or an increase in resolution in an encrypted moving image, and also makes it possible to resolve the problem of having to encrypt/decrypt before/after carrying out transcoding in cases where a compressed moving image is being encrypted.

8 Claims, 5 Drawing Sheets

(51) Int. Cl.
*H04N 21/2343* (2011.01)
*H04N 21/2347* (2011.01)
*H04N 21/4405* (2011.01)

(56) References Cited

U.S. PATENT DOCUMENTS

| | | | |
|---|---|---|---|
| 5,321,748 A | 6/1994 | Zeidler et al. | |
| 5,546,461 A * | 8/1996 | Ibaraki et al. | 380/217 |
| 6,535,687 B1 | 3/2003 | Tinker et al. | |
| 2002/0003881 A1* | 1/2002 | Reitmeier et al. | 380/210 |
| 2003/0068100 A1 | 4/2003 | Covell et al. | |
| 2004/0141731 A1* | 7/2004 | Ishioka et al. | 386/111 |
| 2006/0133647 A1 | 6/2006 | Werner et al. | |
| 2007/0006271 A1* | 1/2007 | Janus | 725/94 |
| 2008/0118062 A1* | 5/2008 | Radivojevic et al. | 380/210 |
| 2010/0223648 A1* | 9/2010 | Tian | 725/88 |

FOREIGN PATENT DOCUMENTS

| | | |
|---|---|---|
| EP | 0949815 | 10/1999 |
| EP | 1110401 | 2/2007 |
| EP | 1889478 | 7/2011 |
| KR | 1020070052634 | 5/2007 |
| KR | 1020070080075 | 8/2007 |
| KR | 1020080023828 | 3/2008 |

* cited by examiner

IMAGE ENCRYPTING/DECRYPTING SYSTEM AND METHOD

TECHNICAL FIELD

The present invention relates to a system and method for encrypting and decrypting moving images and, more particularly, to a system and method for encrypting and decrypting moving images, in which a transmitter and a receiver for transmitting and receiving moving images share a seed for encrypting and decrypting the moving images, the transmitter sorts moving images in segment units, encrypts the sorted images by mixing temporal sequences of the sorted images within each of the segments according to a random number generated based on a seed, and sends the encrypted moving images, and the receiver sorts the received moving images in segment units and decrypts the sorted image by restoring temporal sequences of the sorted images within each of the segments according to a random number generated based on the seed.

BACKGROUND ART

In general, there have been developed video encryption techniques for playing a video, such as encryption methods using encryption techniques, such as the Data Encryption Standard (EES) and the Advanced Encryption Standard (AES) for digital videos, and methods of encrypting specific information of encoded videos, from the scrambling scheme of analog TV.

In conventional digital video encryption methods, a method of encrypting compressed videos rather than a method of encrypting raw video data is performed. This is because raw video data is problematic in that it has a very large amount of data and has low compression performance when the raw video data is modified.

However, in the case where encryption for compressed video is performed, there is a problem in that a transcoding executor must be able to perform encryption and decryption before and after transcoding is performed in order to perform the transcoding.

DISCLOSURE

Technical Problem

Accordingly, the present invention has been made in view of the above problems occurring in the prior art, and an object of the present invention is to provide a system and method for encrypting and decrypting moving images, in which a transmitter and a receiver for transmitting and receiving moving images share a seed for encrypting and decrypting the moving images, the transmitter sorts moving images in segment units, encrypts the sorted images by mixing temporal sequences of the sorted images within each of the segments according to a random number generated based on a seed, and sends the encrypted moving images, and the receiver sorts the received moving images in segment units and decrypts the sorted image by restoring temporal sequences of the sorted images within each of the segments according to a random number generated based on the seed.

Technical Solution

To achieve the above object, an image encryption and decryption system according to the present invention includes an image transmitter for sorting images in segment units, encrypting the images by mixing temporal sequences of the images within each of the segments, encoding the encrypted images, and sending the encoded images and an image receiver for receiving the encoded images from the image transmitter, sorting the received images in segment units, decrypting the sorted images by restoring temporal sequences of the sorted images within each of the segments, decoding the decrypted images, and outputting the decoded images.

Meanwhile, in order to achieve the above object, an image transmitter according to the present invention includes an image reception unit for receiving images; a segment unit for sorting the received images in segment units; a segment encryption unit for encrypting the sorted images by mixing temporal sequences of the images, sorted by the segment unit, within each of the segments; an image encoding unit for encoding the images encrypted by the segment encryption unit; and an image transmitter for sending the encoded images.

Meanwhile, in order to achieve the above object, an image receiver according to the present invention includes a communication unit for receiving encoded images; an image decoding unit for decoding the received images; a segment unit for sorting the decoded images in segment units; a segment decryption unit for decrypting the sorted images by restoring temporal sequences of the sorted images within each of the segments; and an image output unit for outputting the decrypted images.

Meanwhile, in order to achieve the above object, the present invention provides an image encryption and decryption method of a system including an image transmitter for encrypting images and sending the encrypted images and an image receiver for receiving the encrypted images and decrypting the received images, including the steps of (a) the image transmitter sorting images in segment units; (b) the image transmitter encrypting the sorted images by mixing temporal sequences of the shorted images within each of the segments; (c) the image transmitter encoding the encrypted images and sending the encoded images to the image receiver; (d) the image receiver decoding the encoded images, received from the image transmitter, and sorting the decoded images in segment units; (e) the image receiver decrypting the sorted images by restoring temporal sequences of the sorted images within each of the segments; and (f) the image receiver outputting the decrypted image.

Meanwhile, in order to achieve the above object, the present invention provides an image encryption method of an image transmitter for sending encrypted images to an image receiver for receiving the encrypted images and decrypting the received images, including (a) sorting the images in segment units; (b) encrypting the sorted images by mixing temporal sequences of the sorted images within each of the segments; and (c) encoding the encrypted images and sending the encoded images to the image receiver.

Meanwhile, in order to achieve the above object, the present invention provides an image decryption method of an image receiver for receiving images from an image transmitter and decrypting the received images, including (a) decoding the images received from the image transmitter; (b) sorting the decoded images in segment units; (c) decrypting the sorted images by restoring temporal sequences of the sorted images within each of the segments; and (d) outputting the decrypted images.

Meanwhile, in order to achieve the above object, the image encryption method of the image transmitter according to the present invention may be recorded on a computer-readable medium in the form of a program.

Meanwhile, in order to achieve the above object, the image decryption method of the image receiver according to the present invention may be recorded on a computer-readable medium in the form of a program.

Advantageous Effects

According to the present invention, in the case where the resolution of an encrypted moving image is increased or the frames of the encrypted moving image are changed, an encryption function can be effectively operated even after transcoding is performed.

Furthermore, in the case where encryption for compressed moving images is performed, the problem that a transcoding executor must be able to perform encryption and decryption before and after transcoding is performed in order to perform the transcoding can be solved.

Furthermore, in the case where direct processing for moving images, such as transcoding, is performed, encryption can have completeness.

MODE FOR INVENTION

The detailed contents of the object, technical configurations, and operational advantages thereof according to the present invention will be more evidently understood from the following detailed description with reference to the accompanying drawings. Hereinafter, embodiments of the present invention will be described in detail with reference to the drawings.

A moving image shows consecutive still images to a viewer at specific time intervals, thereby making the viewer feel like the still images move. Accordingly, a moving image consists of one or more sheets of images. Each of the images includes information about a time stamp in which the image is temporally displayed. For example, a moving image having the frame rate of 30 frames per second (fps) shows 30 sheets of images per second, thereby making a viewer feel like the image is a moving image. Here, each of the images has time stamp information per 1/30 second. In the present invention, temporal sequences of images are mixed using a specific method, and the mixed sequences are shared by an encryption apparatus and a decryption apparatus, so that the original sequences of the images can be restored.

Figure 1:
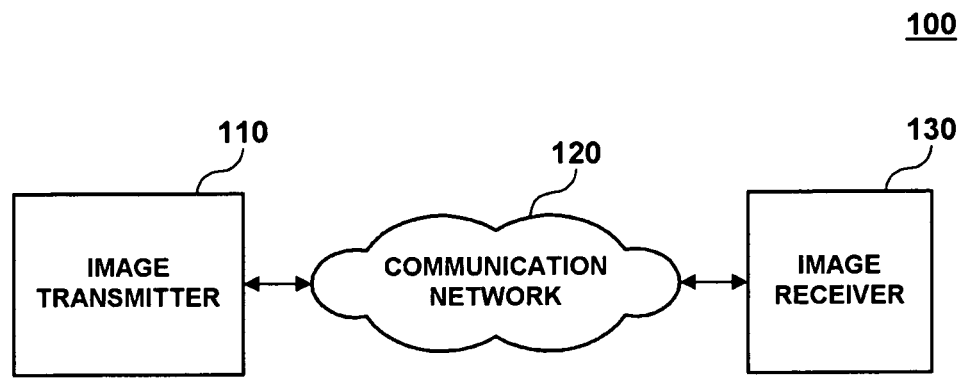
FIG. 1 shows a configuration schematically showing moving an image encryption system according to an embodiment of the present invention.

FIG. 1 shows a configuration schematically showing an image encryption system according to an embodiment of the present invention.

Referring to FIG. 1, the image encryption system 100 according to the present invention includes an image transmitter 110, a communication network 120, and an image receiver 130.

The image transmitter 110 sorts images in segment units, encrypts the images by mixing temporal sequences of the sorted images within each of the segments, encodes the encrypted images, and sends the encoded images to the image receiver 130.

Furthermore, the image transmitter 110 sorts units at each of which a shot change is generated in images in segment units.

Furthermore, the image transmitter 110 determines the temporal sequences of the images based on a seed inputted to a pseudo random generator.

Furthermore, the image transmitter 110, together with the image receiver 130, shares the seed inputted to the pseudo random generator.

The communication network 120 provides a transmission path along which images transmitted by the image transmitter 110 are transferred to the image receiver 130. Here, in the case where the image transmitter 110 and the image receiver 130 are wired communication devices, the communication network 120 may be a wired communication network, such as the Internet or a cable. In the case where the image transmitter 110 and the image receiver 130 are wireless communication devices, the communication network 120 may be a wireless communication network, such as a mobile communication network.

The image receiver 130 receives encoded images transmitted by the image transmitter 110, sorts the received images in segment units, restores and decrypts temporal sequences of the sorted images within each of the segments, decodes the decrypted images, and outputs the decoded images on a screen.

Furthermore, the image receiver 130 generates a random number based on a seed inputted to a pseudo random generator and restores the temporal sequences of the images using the random number.

Figure 2:
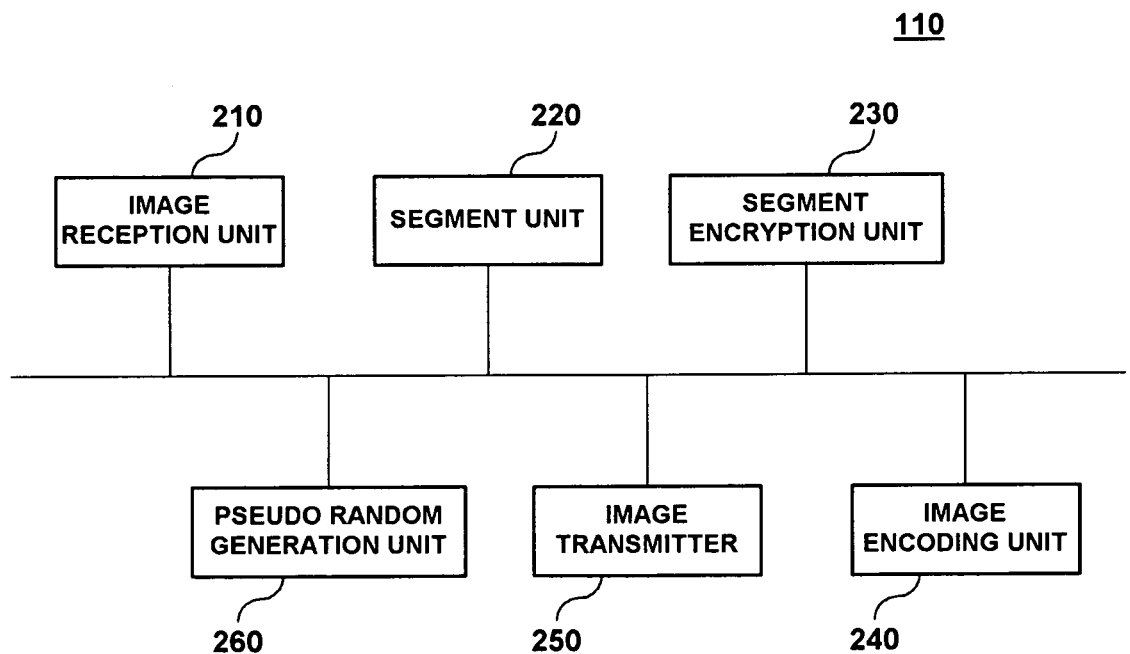
FIG. 2 shows a configuration schematically showing the internal construction of an image transmitter according to an embodiment of the present invention.

FIG. 2 shows a configuration schematically showing the internal construction of the image transmitter according to an embodiment of the present invention.

Referring to FIG. 2, the image transmitter 110 according to the present invention includes an image reception unit 210, a segment unit 220, a segment encryption unit 230, an image encoding unit 240, an image transmitter 250, and a pseudo random generation unit 260.

The image reception unit 210 receives images, such as moving image.

The segment unit 220 sorts the inputted images in segment units. Here, the segment unit 220 sorts units at each which a shot change is generated in the images in segment units.

The segment encryption unit 230 encrypts temporal sequences of the images within each of the segments sorted by the segment unit 220 by mixing the temporal sequences of the images. Furthermore, the segment encryption unit 230 encrypts the temporal sequences of the sorted images within each of the segments according to a random number generated by a seed inputted to the pseudo random generation unit 260.

The image encoding unit 240 encodes the images encrypted by the segment encryption unit 230.

The image transmitter 250 outputs and sends the encoded images. Furthermore, the image transmitter 250 sends the seed, inputted to the pseudo random generation unit 260, to the image receiver 130.

The pseudo random generation unit 260 generates the random number for mixing the temporal sequences of the images.

Figure 3:
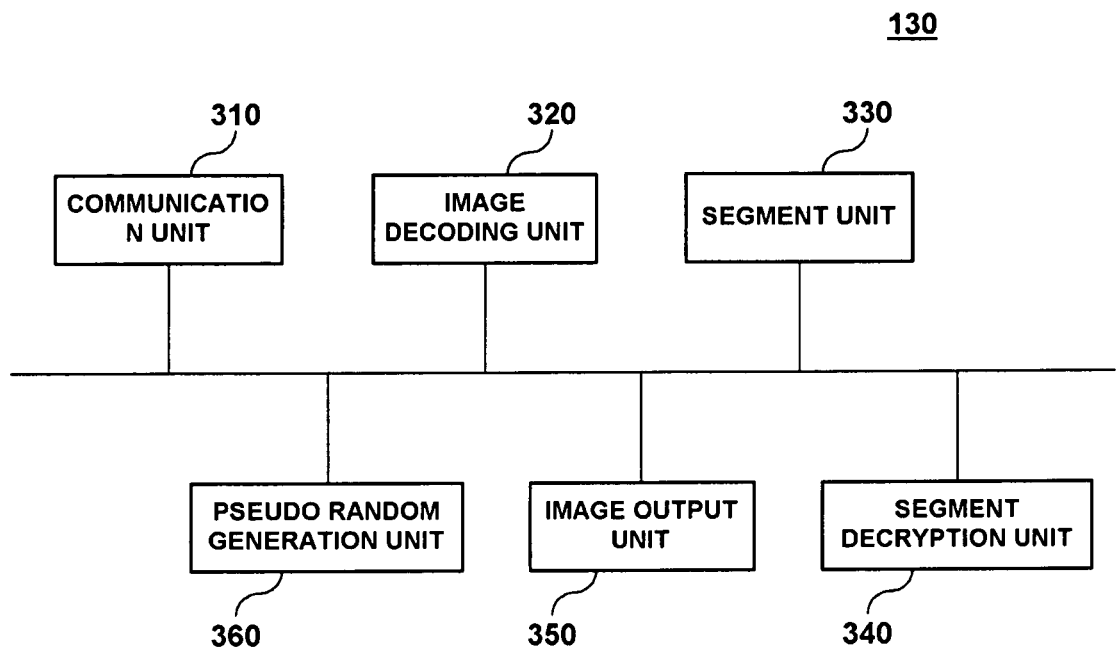
FIG. 3 shows a configuration schematically showing the internal construction of an image receiver according to an embodiment of the present invention.

FIG. 3 shows a configuration schematically showing the internal construction of the image receiver according to an embodiment of the present invention.

Referring to FIG. 3, the image receiver 130 according to the present invention includes a communication unit 310, an image decoding unit 320, a segment unit 330, a segment decryption unit 340, an image output unit 350, and a pseudo random generation unit 360.

The communication unit 310 communicates with the image transmitter 110 ova the communication network 120 and receives encoded images from the image transmitter 110.

The image decoding unit 320 decodes the encoded images received through the communication unit 310.

The segment unit 330 sorts the images, decoded by the image decoding unit 320, in segment units. Furthermore, the segment unit 330 sorts units at each of which a shot change is generated in the images in segment units.

The segment decryption unit 340 decrypts the images, sorted by the segment unit 330, by restoring temporal sequences of the sorted images within each of the segments. Furthermore, the segment decryption unit 340 generates a random number based on a seed, shared by the image transmitter 110 that has sent the encoded images and inputted to the pseudo random generation unit 360. Next, the segment decryption unit 340 restores the temporal sequences of the images based on the random number generated by the pseudo random generation unit 360.

The image output unit 350 outputs the images decrypted by the segment decryption unit 340.

The pseudo random generation unit 360 generates the random number for restoring the temporal sequences of the images.

Figure 4:
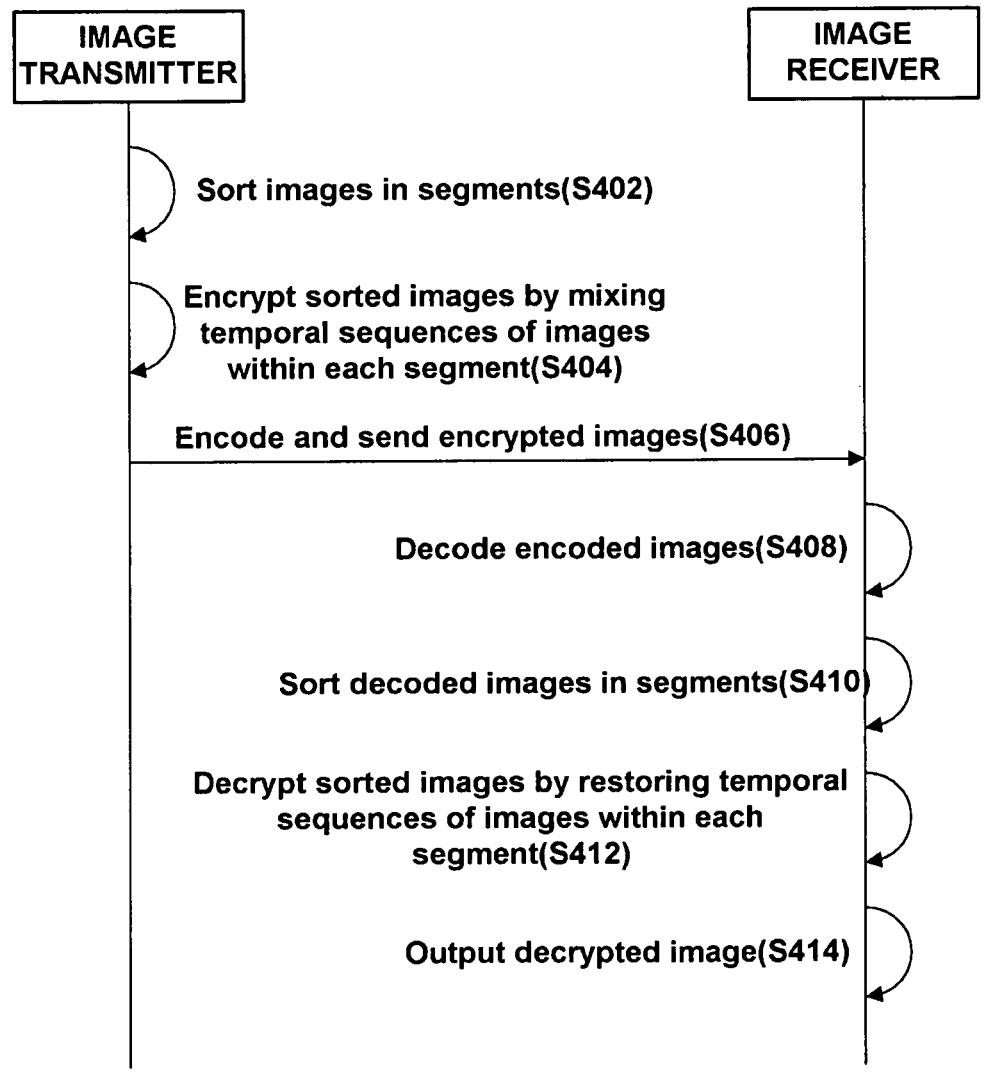
FIG. 4 is a flowchart illustrating an image encryption and decryption method according to an embodiment of the present invention.

FIG. 4 is a flowchart illustrating an image encryption and decryption method according to an embodiment of the present invention.

Referring to FIG. 4, the image transmitter 110 sorts images, externally received through the image reception unit 210, through the segment unit 220 in segment units at step S402.

Here, the segment unit 220 sorts units at each of which a shot change is generated in segment units with respect to the received images.

The image transmitter 110 encrypts the images sorted by the segment unit 220 by mixing temporal sequences of the sorted images within each of the segments through the segment encryption unit 230 at step S404.

Here, the segment encryption unit 230 encrypts the segments by mixing temporal sequences of images within each of the segments according to a random number generated based on a seed inputted to the pseudo random generation unit 260.

The image transmitter 110 encodes the images, encrypted by the segment encryption unit 230, through the image encoding unit 240 and sends the encoded images to the image receiver 130 through the image transmitter 250 at step S406.

Here, the encoded images transmitted by the image transmitter 110 are transferred to the image receiver 130 over the communication network 120.

Meanwhile, the image receiver 130 receives the encoded images from the image transmitter 110 through the communication unit 310.

The image receiver 130 decodes the encoded images, received from the image transmitter 110, through the image decoding unit 320 at step S408.

Next, the image receiver 130 sorts the images, decoded by the image decoding unit 320, in segment units through the segment unit 330 at step S410.

The image receiver 130 decrypts the images, sorted by the segment unit 330, by restoring temporal sequences of the sorted images within each of the segments through the segment decryption unit 340 at step S412.

Here, the image receiver 130 generates a random number based on the seed which is shared by the image transmitter 110 and has been inputted to the pseudo random generation unit 360 and restores the temporal sequences of the images according to the generated random number.

Next, the image receiver 130 outputs the decrypted images through the image output unit 350 at step S414.

Here, the image output unit 350 may be a display device of an LCD or PDP type. If the image receiver 130 is a portable terminal, the image output unit 350 may be a display device of an OLED type.

Figure 5:
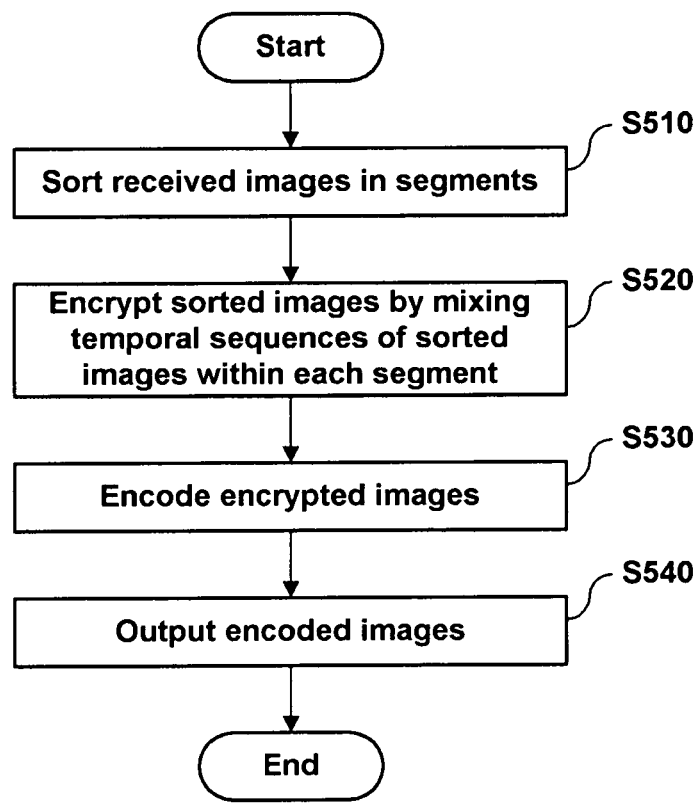
FIG. 5 is an operational flowchart illustrating an image encryption method of the image transmitter according to an embodiment of the present invention.

FIG. 5 is an operational flowchart illustrating an image encryption method of the image transmitter according to an embodiment of the present invention.

Referring to FIG. 5, the image transmitter 110 according to the present invention sorts images, received through the image reception unit 210, in segment units through the segment unit 220 at step S510.

Here, the segment unit 220 sorts units at each of which a shot change is generated in segment units with respect to the images.

The image transmitter 110 encrypts the images, sorted in segment units by the segment unit 220, by mixing temporal sequences of the images within each of the segments through the segment encryption unit 230 at step S520.

Here, the segment encryption unit 230 encrypts the sorted images by mixing the temporal sequences of the images within each of the segments according to a random number generated by a seed inputted to the pseudo random generation unit 260.

The image transmitter 110 encodes the images, encrypted by the segment encryption unit 230, through the image encoding unit 240 at step S530.

Next, the image transmitter 110 sends the images, encoded by the image encoding unit 240, to the image receiver 130 through the image transmitter 250 at step S540.

Here, the image transmitter 110 sends the seed, inputted to the pseudo random generation unit 260, to the image receiver 130 so that the image receiver 130 can share the seed.

Figure 6:
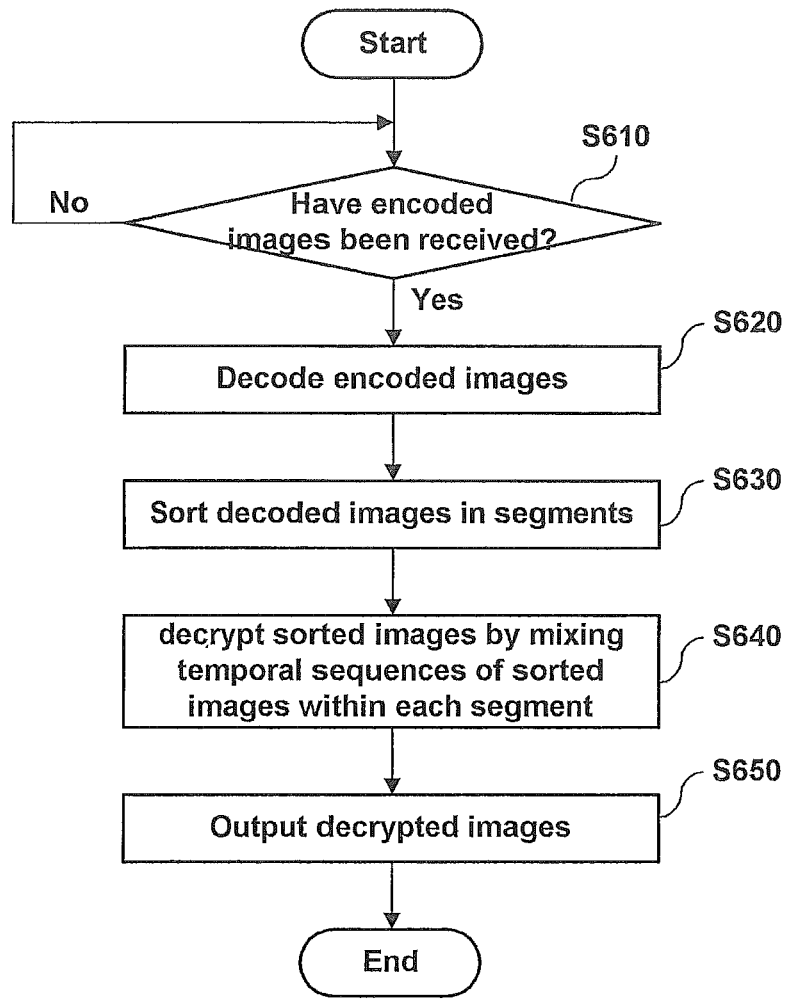
FIG. 6 is an operational flowchart illustrating an image decryption method of the image receiver according to an embodiment of the present invention.

FIG. 6 is an operational flowchart illustrating an image decryption method of the image receiver according to an embodiment of the present invention.

Referring to FIG. 6, the image receiver 130 according to the present invention receives encoded images, transmitted by the image transmitter 110, through the communication unit 310 connected to the communication network 120 at step S610.

The image receiver 130 decodes the received encoded images through the image decoding unit 320 at step S620.

The image receiver 130 sorts the images, decoded by the image decoding unit 320, in segment units through the segment unit 330 at step S630.

Here, the segment unit 330 sorts units at each of which a shot change is generated in segment units with respect to the images.

The image receiver 130 decrypts each of the images, sorted by the segment unit 330 in segment units by restoring temporal sequences of the images within each of the segments through the segment decryption unit 340 at step S640.

Here, the segment decryption unit 340 generates a random number based on a seed which is shared by the image transmitter 110 and has been inputted to the pseudo random generation unit 360 and restores temporal sequences of the images according to the generated random number.

The image receiver 130 outputs the images, decrypted by the segment decryption unit 340, through the image output unit 350 at step S650.

Meanwhile, the image encryption method of the image transmitter according to the present invention may be recorded on a computer-readable medium, such as CD or USB memory, in the form of a program. Furthermore, the image decryption method of the image receiver according to the present invention may be recorded on a computer-readable medium in the form of a program.

As described above, the present invention can realize the system and method for encrypting and decrypting moving images, in which the transmitter and the receiver for transmitting and receiving moving images share a seed for encrypting and decrypting the moving images, the transmitter sorts moving images in segment units, encrypts the sorted images by mixing temporal sequences of the sorted images within each of the segments according to a random number generated based on a seed, and sends the encrypted moving images, and the receiver sorts the received moving images in segment units and decrypts the sorted images by restoring temporal sequences of the sorted images within each of the segments according to a random number generated based on the seed.

A person having ordinary skill in the art may implement the present invention in other detailed forms without departing from the technical spirit or indispensable characteristic of the present invention. It will be understood that the above-described embodiments are illustrative and not limitative from all aspects. The scope of the present invention is defined by the appended claims rather than the detailed description. Thus, it will be understood that the present invention should be construed to cover all modifications or variations induced from the meaning and scope of the appended claims and their equivalents.

Industrial Applicability

The present invention may be applied to devices requiring encryption for compressed moving images. Furthermore, the present invention may be applied to devices requiring decryption for encryption and compressed moving images.

Furthermore, the present invention may be applied to systems for encrypting multimedia data, such as moving images, and sending the multimedia data to remote media play devices.

Furthermore, the present invention may be applied to media play systems for receiving encrypted multimedia data from remote places over a communication network, decrypting the received multimedia data, and displaying the decrypted multimedia data.

The invention claimed is:

1. An image encryption and decryption system for transmitting digital videos, each digital video consisting of a plurality of image frames, through a communication network, said image encryption and decryption system comprising:

an image transmitter for sorting said image frames into segments with each segment being initiated by the occurrence of a change of scene (shot) in the image frames, and for encrypting the sorted image frames by mixing temporal sequences of the image frames within each segment based on timestamp information contained within each image frame, encoding the sorted encrypted image frames, and transmitting the encoded sorted encrypted image frames;

an image receiver for receiving the encoded sorted image frames from the image transmitter, decoding the received encoded image frames, sorting the decoded image frames into the segments, decrypting the sorted segments by restoring the temporal sequences of the image frames within each segment, and outputting the decrypted image frames, with the image receiver or image transmitter including a CPU;

a pseudo random generator device that generates a random number;

wherein the image transmitter encrypts the sorted image frames by using the generated random number for mixing the temporal sequences of the image frames within each segment, the generated random number being generated based on a seed inputted to the pseudo random generator; and wherein the image transmitter and the image receiver share the seed inputted to the pseudo random generator.

2. An image receiver, comprising:

a CPU;

a communication device that receives encrypted and encoded digital videos, each video consisting of a plurality of consecutive image frames, from a transmitter which sorts the image frames into segments corresponding to whenever a change in scene (shot) occurs in the consecutive image frames, encrypts the image frames by mixing the temporal sequences of the image frames in each segment based on timestamp information contained within each image frame and encodes the encrypted image frames;

an image decoder that decodes the received image frames;

a segmenter that sorts the decoded image frames into segments;

a segment decryption device that decrypts the sorted image frames by restoring the temporal sequences of the sorted image frames within each of the segments;

an image outputting device that outputs the decrypted image frames; and a pseudo random generation device that generates a random number for restoring the temporal sequences of the sorted image frames;

wherein the random number is generated based on a seed inputted to the pseudo random generation device, and the segment decryption device restores the temporal sequences of the sorted image frames within each of the segments using the generated random number.

3. An image encryption and decryption method, comprising an image transmitter for encrypting digital videos, each digital video consisting of a plurality of consecutive image frames, and sending the encrypted digital videos to an image receiver and decrypting the received digital videos, the image encryption and decryption method comprising the steps of:

(a) the image transmitter sorting the image frames into segments corresponding to whenever a change in scene (shot) is generated in the consecutive image frames;

(b) the image transmitter encrypting the sorted image frames by mixing temporal sequences of the image frames within each of the segments based on timestamp information contained within each image frame;

(c) the image transmitter encoding the encrypted image frames and sending the encoded encrypted image frames to the image receiver;

(d) the image receiver decoding the encoded image frames, received from the image transmitter, and sorting the decoded image frames into segments;

(e) the image receiver decrypting the sorted image frames by restoring temporal sequences of the image frames within each of the segments;

(f) the image receiver outputting the decrypted image frames;

wherein the step (b) comprises mixing the temporal sequences of the image frames within each of the segments according to a random number generated using a pseudo random generator based on a seed inputted to the pseudo random generator; and wherein the temporal sequences of the image frames are restored in step (e) within each of the segments using the generated random number.

4. An image encryption method of an image transmitter for sending encrypted digital videos, each digital video consisting of a plurality of consecutive image frames, to an image receiver for receiving the encrypted digital videos and decrypting the received digital videos, the image encryption method comprising:

(a) sorting the image frames into segments corresponding to whenever a change in scene (shot) is generated in the consecutive image frames;

(b) encrypting the sorted image frames by mixing temporal sequences of the image frames within each of the segments based on timestamp information contained within each image frame; and (c) encoding the encrypted image frames and sending the encoded encrypted image frames to the image receiver;

wherein the step of mixing the temporal sequences of the image frames in step (b) occurs within each of the segments according to a random number generated by a pseudo random generator based on a seed inputted to the pseudo random generator.

5. An image decryption method of an image receiver for receiving digital videos, each digital video consisting of a plurality of consecutive image frames, from an image transmitter and decrypting the received digital videos, the method comprising:

(a) decoding the image frames received from the image transmitter, the image transmitter segmenting the image frames into segments based on a change of scene (shot) in the image frames, encrypting the image frames by mixing temporal sequences of the image frames within each segment based on timestamp information contained within each image frame, encoding the sorted encrypted image frames, and transmitting the encoded sorted encrypted image frames to the image receiver;

(b) sorting the decoded image frames into segments;

(c) decrypting the sorted image frames by restoring the temporal sequences of the sorted image frames within each of the segments; and (d) outputting the decrypted image frames;

wherein step (c) comprises first generating a random number from a pseudo random generator based on a seed inputted to the pseudo random generator which is shared by both the image transmitter and image receiver before decrypting the sorted image frames and restoring the temporal sequences of the sorted image frames within each of the segments according to the generated random number.

6. A non-transitory computer-readable medium comprising a program for implementing an image encryption method of an image transmitter for sending encrypted digital videos, each digital video consisting of a plurality of consecutive image frames, to an image receiver for receiving the encrypted digital videos and decrypting the received digital videos, the image encryption method comprising:

(a) sorting the image frames into segments corresponding to whenever a change in scene (shot) is generated in the consecutive image frames;

(b) encrypting the sorted image frames by mixing temporal sequences of the image frames within each of the segments based on timestamp information contained within each mage frame; and (c) encoding the encrypted image frames and sending the encoded encrypted image frames to the image receiver;

wherein the step of mixing the temporal sequences of the image frames in step (b) occurs within each of the segments according to a random number generated by a pseudo random generator based on a seed inputted to the pseudo random generator.

7. A non-transitory computer-readable medium comprising a program for implementing an image decryption method of an image receiver for receiving digital videos, each digital video consisting of a plurality of consecutive image frames, from an image transmitter and decrypting the received digital videos, the method comprising:

(a) decoding the image frames received from the image transmitter, the image transmitter segmenting the image frames into segments based on a change of scene (shot) in the image frames., encrypting the image frames by mixing temporal sequences of the image frames within each segment based on timestamp information contained within each image frame, encoding the sorted encrypted image frames, and transmitting the encoded sorted encrypted image frames to the image receiver;

(b) sorting the decoded image frames into segments;

(c) decrypting the sorted image frames by restoring the temporal sequences of the sorted image frames within each of the segments; and (d) outputting the decrypted image frames;

wherein step (c) comprises first generating a random number from a pseudo random generator based on a seed inputted to the pseudo random generator which is shared by both the image transmitter and image receiver before decrypting the sorted image frames and restoring the temporal sequences of the sorted image frames within each of the segments according to the generated random number.

8. An image transmitter, comprising:

a CPU;

an image receptor that receives image frames;

a segmenter that sorts the received image frames into segments with each segment being initiated by the occurrence of a change of scene(shot) in the image frames;

a segment encryption device that encrypts the sorted image frames sorted by the segmenter by mixing temporal sequences of the image frames within each of the segments based on timestamp information contained within each image frame;

an image encoding device that encodes the encrypted image frames;

an image transmitter that sends the encoded image frames; and a pseudo random generation device that generates a random number for mixing the temporal sequences of the image frames;

wherein the random number is generated based on a seed inputted to the pseudo random generation device and the segment encryption device mixes the temporal sequences of the sorted image frames within each of the segments using the generated random number.

* * * * *